June 1, 1954 S. A. RAINOUS 2,679,705
STEREOPTICAL VIEWER WITH AUTOMATIC PICTURE CHANGE
Filed May 3, 1952 3 Sheets-Sheet 1
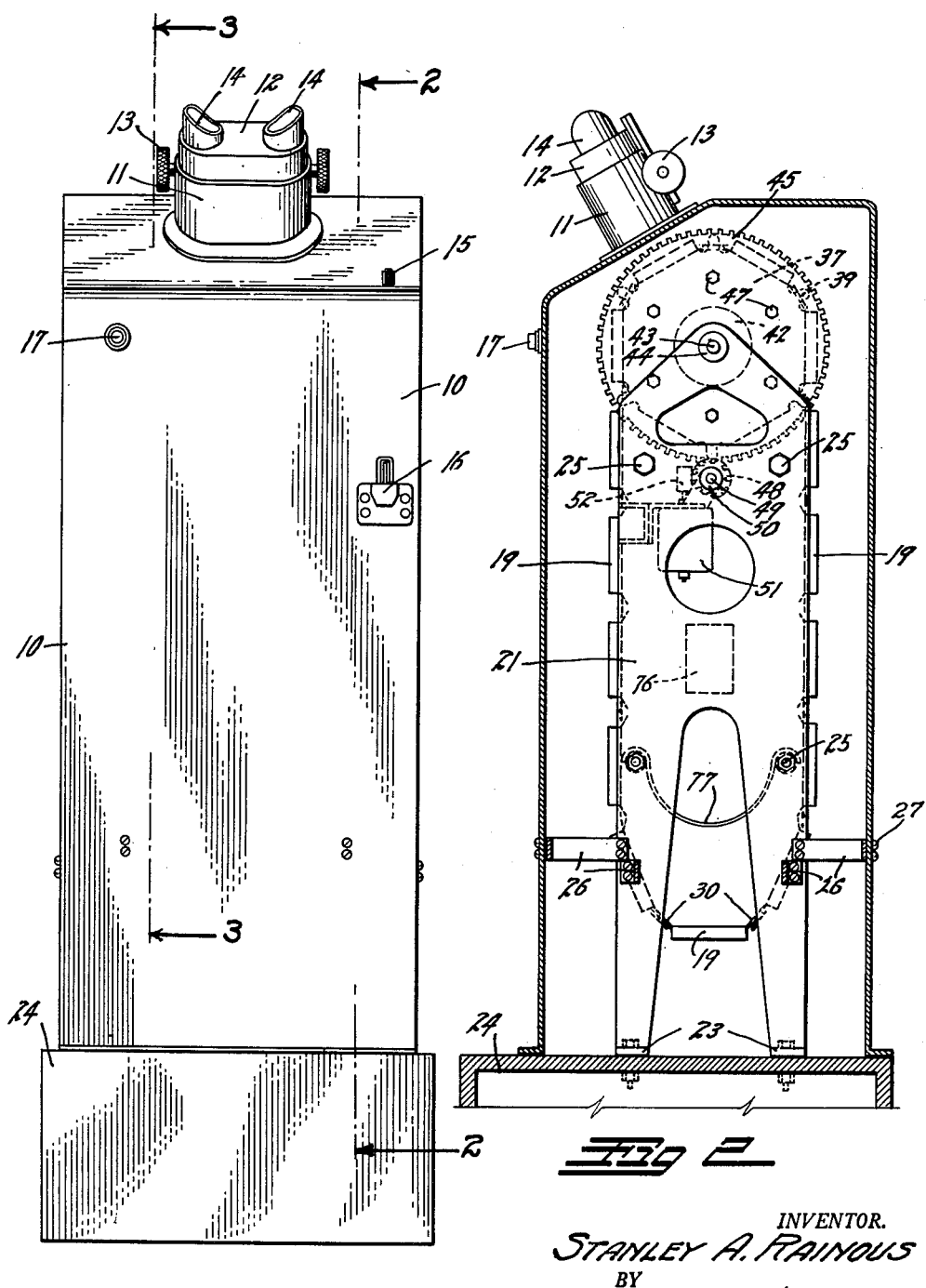
INVENTOR.
STANLEY A. RAINOUS
BY
ATTORNEY June 1, 1954  S. A. RAINOUS  2,679,705
STEREOPTICAL VIEWER WITH AUTOMATIC PICTURE CHANGE
Filed May 3, 1952  3 Sheets-Sheet 2

INVENTOR.
STANLEY A. RAINOUS
BY
ATTORNEY

June 1, 1954 S. A. RAINOUS 2,679,705
STEREOPTICAL VIEWER WITH AUTOMATIC PICTURE CHANGE
Filed May 3, 1952 3 Sheets-Sheet 3
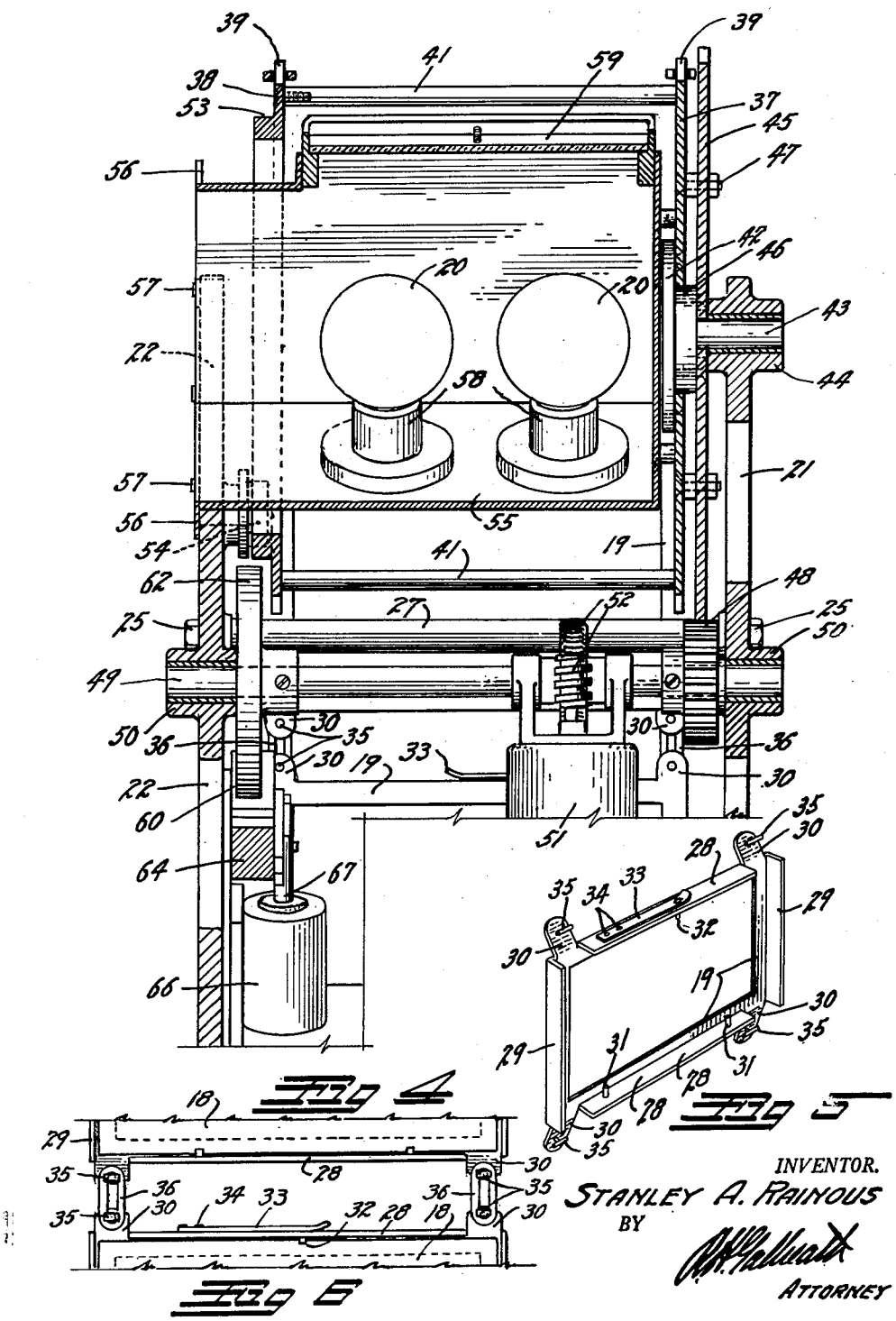
INVENTOR.
STANLEY A. RAINOUS
BY
ATTORNEY Patented June 1, 1954

2,679,705

UNITED STATES PATENT OFFICE 2,679,705

STEREOPTICAL VIEWER WITH AUTOMATIC PICTURE CHANGE

Stanley A. Rainous, Denver, Colo.

Application May 3, 1952, Serial No. 285,956

5 Claims. (Cl. 40—53)

This invention relates to a coin-actuated picture-displaying device, and has for its principal object the provision of a highly efficient mechanism for illuminating and successively displaying a plurality of transparent, stereoscopic views.

Another object of the invention is to provide view slide holders for stereoscopic view projecting machines which will themselves form links of a continuous, endless chain so that slides may be added to or subtracted from the chain without interfering with the operation of the machine.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of the improved, stereoscopic, picture displaying machine;

Fig. 2 is a vertical section therethrough, taken on the line 2—2, Fig. 1;

Fig. 4 is a similarly enlarged, fragmentary section, taken on the line 4—4, Fig. 3;

Fig. 5 is a detail, perspective view of a view-slide holder employed in the improved machine; and Fig. 6 is a fragmentary face view of a means for interconnecting a plurality of picture slide holders in the improved machine.

Figure 3:
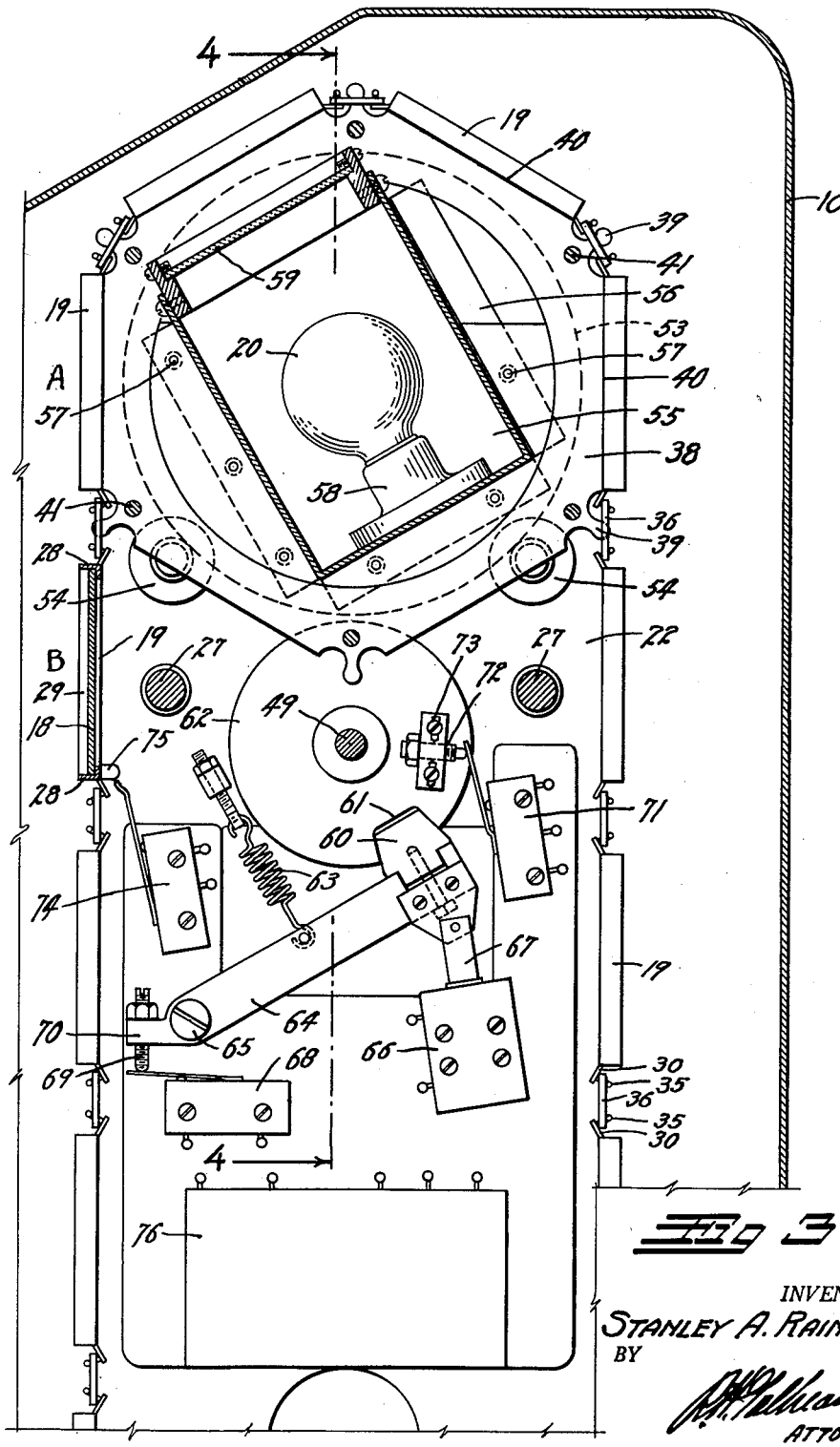
Fig. 3 is an enlarged, fragmentary, vertical section, taken on the line 3—3, Fig. 1.

In Fig. 4, the outer casing of the machine has been eliminated for the purpose of illustration.

The improved stereoscopic, transparent, picture viewing machine is entirely enclosed in a vertically elongated outer housing 10, the top of which is inclined downwardly and forwardly to support a conventional lens sleeve 11 in which a stereoscopic lens barrel 12 is telescopically mounted so as to be focusable by means of the usual focusing knobs 13. The lens barrel is provided with the usual eye shields 14. The lens mechanism is conventional equipment and forms no part of the present invention.

The outer housing 10 is provided with a coin-receiving slot 15 and a coin-return pocket 16 and a lamp lighting push button 17. The coins are fed to any standard coin-operated mechanism designed to close an electrical circuit upon the reception of the proper coin. Such mechanisms are purchasable upon the open market and need not be illustrated or described in detail here.

Each of the views to be displayed consists of two stereoscopically related photographic transparencies mounted on a transparent slide plate 18. The slide plates are removably mounted in slide frames which are herein designated in their entirety by the numeral 19 and illustrated in detail in Fig. 5. The object of this invention is to successively position the slide plates 18 in sequence before the lenses of the stereoscopic viewing device, and to project light rays from suitable electric lamps 20 through the plates 18 toward the eyes of the viewer.

The actuating mechanism is carried by two vertically elongated side frames 21 and 22 provided with supporting feet 23 which are bolted or otherwise secured to a supporting base box 24, which also supports the outer housing 10. The side frames 21 and 22 are braced from, and held in spaced relation with, the outer housing 10 by means of suitable spacing braces 26 and are maintained in parallel, vertical relation by means of spacing rods 27, the extremities of which are secured to the side frames by means of cap screws 25.

The slide frames 19 are stamped from sheet metal to provide two side flanges 28, two rectangularly related end flanges 29, and four projecting ears 30. One of the side flanges 28 is provided with two fixed, plate-retaining studs 31, and the other side flange 28 is provided with a withdrawable plate-retaining stud 32. The latter stud is mounted in a leaf spring 33 and projects through an opening in the adjacent side flange 28. The other extremity of the spring 33 is riveted, as shown at 34, or otherwise secured to the side flange 28. Thus, one of the slide plates 18 can be slipped behind the fixed studs 31 and thence swung into the plate frame 19, where it will be retained by the withdrawable stud 32. The slide plates can be quickly and easily removed from the plate holders by simply lifting the leaf springs 33.

Each of the ears 30 is provided with a T-shaped stud 35 over which an elongated connecting link 36 can be slipped, to connect each frame with the next adjacent frames, as shown in Fig. 6, so as to provide a continuous chain of frames.

The chain of frames is supported by two supporting sprocket wheels 37 and 38. Each sprocket wheel is formed with a plurality of spaced sprocket teeth 39, positioned to engage in the open elongated links 36, and with flat lands 40 against which the backs of the slide frames 19 rest as the latter travel round the sprocket wheels. A drip pan 77 is positioned above the lower loop of plate frames to prevent oil, dust, etc. from dropping thereon.

The sprocket wheel 38 is supported from and maintained in concentric, parallel, spaced relation with the sprocket wheel 37 by means of spacing bars 41. The sprocket wheel 37 is fixedly mounted against a flange 42 formed on the inner extremity of a stub shaft 43 which is rotatably mounted in a bearing boss 44 on the side frame 21. The mid-portion of the sprocket wheel 38 is completely open and it is supported through the medium of a track flange 53 formed on the sprocket wheel which rides on supporting rollers 54 mounted on the inner face of the side frame 22.

The stub shaft and its related sprocket wheel 37 are rotated through the medium of a toothed gear disc 45. The gear disc 45 is secured to and against a shoulder 46 on the stub shaft 43, and is also fixedly secured to the sprocket wheel 37 by means of suitable attachment bolts 47. The gear disc 45 is rotated from a spur gear 48 fixedly mounted on a counter-shaft 49 which is journalled in bearing bosses 50 in the side frames 21 and 22 below the sprocket wheels 37 and 38. The counter-shaft 49 is rotated in any desired manner from an electric motor 51 such as through the medium of worm gearing 52.

A rectangular lamp housing 55 is positioned between the sprocket wheels 37 and 38 and is supported through the open center of the sprocket wheel 38 from the side frame 22. The lamp housing is attached to the side frame 22 by means of attachment screws 57 extending through flanges 56 formed on the lamp housing. The lamps 20 are held in suitable receptacles 58 mounted on the bottom of the lamp housing 55 and project light against the back of the slide plate 18, through a frosted front glass 59 positioned in the lamp housing 55 between the lens barrel 12 and the lamps 20.

As illustrated, the sprocket wheels are provided with six sprocket teeth 39 and six lands 40. The ratio betweein the gear disc 45 and the spur gear 48 is six-to-one, that is, the sprocket wheels will rotate one-sixth of a revolution at each complete revolution of the counter-shaft 49 so as to position the next successive frame 19 in front of the illuminated glass front 59.

The counter-shaft 49 is stopped and held at the termination of each complete revolution thereof by means of a stop pawl 60 mounted on the extremity of a pawl lever 64. The lever 64 and the pawl 60 are so positioned that the pawl 60 will engage a stop notch 61 in a disc cam 62 fixedly mounted on the counter-shaft 49. The stop pawl 60 is constantly urged into engagement with its notch 61 by means of a tension spring 63 connected to the cam lever 64. The lever 64 is pivotally mounted on a lever screw 65 threaded into the side plate 22. The stop pawl is pulled from its notch 61 at intervals by energizing a solenoid 66, the armature of which, indicated at 67, is connected to the lever 64.

A first normally-open micro-switch 68 is mounted on the side plate 22 adjacent the lever 64 so that it may be acted against by a set screw 69 which is adjustably carried in a foot 70 extending from the lever 64 on the opposite side of the pivot screw 65. A second 3-way microswitch 71 is mounted on the side plate 22 adjacent the disc cam 62 so that it will be actuated by means of a second set screw 72 mounted in a retaining bracket 73 adjustably mounted on the disc cam 62. A third normally-closed microswitch 74 is mounted on the side plate 22 adjacent the upwardly traveling reach of the connected plate frames 19. A terminal lug 79 projects inwardly from one of the frames 19 to contact and open the switch 74 once at the completion of each complete cycle of the entire series of connected plate frames 19. A conventional, motor-operated, repeat-cycle, timer circuit closer is mounted on the side plate 22 within an enclosing housing 76. The various microswitches, solenoid, and timer circuit closer are electrically connected to operate as follows.

Let us assume a coin is inserted in the coin slot 15. This coin actuates the conventional coin-controlled circuit closer to close a circuit through the micro-switch 74 to start the timer circuit closer in the housing 76. The timer circuit closer closes electrical contacts to complete electric circuits through the micro-switch 71 to the solenoid 66, to actuate the latter to withdraw the stop pawl 60 from its notch 61, and to complete a circuit to the motor 51 to start the latter. This will cause the counter-shaft 49 to rotate one complete revolution so as to elevate the next successive picture, indicated at A, to viewing position between the viewing lenses and the lamp housing 55.

When the picture A reaches the viewing position, the set screw 72 will actuate the second micro-switch 71 to open the circuits to the solenoid 66 and the motor 51 in time for the stop pawl 60 to enter its notch 61 to lock the picture A in the viewing position.

After a pre-set time interval, say ten seconds, the timer circuit closer will again close the circuits to the solenoid 66 and the motor 51 as before to bring the second picture, indicated at B, to the viewing position. When the picture B reaches the viewing position, the set screw 72 will again actuate the switch 71 to open the solenoid and motor circuits and release the stop pawl 60 and lock the picture B in viewing position for a second time interval.

The above sequence of operations is repeated until the entire series of pictures on the chain have been viewed. As the first picture of the series again approaches its viewing position, the lug 75 will actuate the micro-switch 74 to de-energize all circuits until another coin is inserted.

The micro-switch 68 is of the normally open type, and is connected in series with the lamps 20. It is closed to complete a circuit to the lamps by pressure of the set screw 69. Thus, whenever the stop pawl 60 is in position in its notch 61, the lamp circuit is closed and the lamps are lighted, and during each picture change, that is, when the stop pawl is withdrawn from its notch, the lamps are extinguished.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for displaying transparent picture slides comprising: a plurality of slide holders; a pair of links connecting each slide holder to each adjacent slide holder in an endless chain; a drive sprocket wheel over which one of the links of each pair of links rides; an annular sprocket wheel over which the other link of each pair of links rides, said annular sprocket wheel having an open center; connecting members connecting said two sprocket wheels in fixed, spaced relation; a lamp positioned between said sprocket wheels; lamp-supporting means extending through the open center of the annular sprocket wheel and supporting said lamp; means for driving said drive sprocket wheel in preset intervals; and means for stopping movement of said wheel intermediate said intervals.

2. A device for displaying transparent picture slides as described in claim 1 in which the means for driving comprises: a counter-shaft positioned parallel to the axis of rotation of said sprocket wheels; a spur gear on said counter-shaft; and an annular, toothed gear secured to said drive sprocket in mesh with said spur gear; and in which the means for stopping comprises: a cam disc on said counter-shaft having a retaining notch formed in its periphery; a pawl arm positioned to engage said notch; and means for simultaneously imparting rotation to said counter-shaft and withdrawing said pawl arm from its notch.

3. A device for displaying transparent picture slides as described in claim 2 in which the means for simultaneously imparting rotation and withdrawing said pawl arm comprises: a solenoid; an armature positioned to be attracted by said solenoid and connected with said pawl arm; a motor; means for transmitting rotation from said motor to said counter-shaft; and an electrical switch operable by said pawl arm in circuit with said lamp for illuminating the latter when said pawl arm is withdrawn from its notch.

4. A device for displaying transparent picture slides as described in claim 2 in which the counter-shaft rotates one complete revolution for each tooth space on said sprocket wheels, and having a second electrical switch operable from said counter-shaft in circuit with said motor for breaking the circuit to the latter when said countershaft has completed one revolution.

5. A device for displaying transparent picture slides as described in claim 4 having means for opening the circuit to said solenoid after the complete series of slide holders has passed before said lamp, comprising: a third electrical switch, and a switch-operating member projecting from one of said slide holders and positioned to actuate the third switch.

References Cited in the file of this patent

UNITED STATES PATENTS

| Number | Name | Date |
|---|---|---|
| 678,936 | Bronori | July 23, 1901 |
| 1,042,519 | Wotherspoon | Oct. 29, 1912 |
| 1,321,241 | Olvis | Nov. 11, 1919 |
| 1,780,090 | McIntire | Oct. 28, 1930 |
| 2,076,924 | Spindler | Apr. 13, 1937 |
| 2,260,660 | Darwin | Oct. 28, 1941 |
| 2,586,176 | Olsen | Feb. 19, 1952 |